Figure 1:
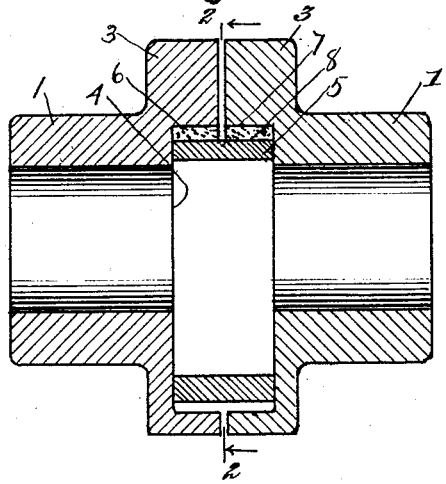

Dec. 27, 1932.  C. H. CLARK  1,891,915

FLEXIBLE COUPLING

Filed July 18, 1928

Inventor

Charles Haskell Clark.

Patented Dec. 27, 1932

1,891,915

UNITED STATES PATENT OFFICE

CHARLES HASKELL CLARK, OF NEW YORK, N. Y.

FLEXIBLE COUPLING

Application filed July 18, 1928. Serial No. 293,723,

This is a continuation in part of my application Serial No. 27,010, filed April 30, 1925, for flexible couplings on which issued Patent No. 1,689,861, October 30, 1928.

This invention relates to flexible couplings for coupling the ends of shafts together to turn about the same axis subject, of course, to end play and misalignment.

The main objects of this invention are to provide a very inexpensive, simple and strong flexible coupling for the above purpose; to provide a coupling very easy to align and to provide a type of coupling known as a double coupling in which the center line of the floating transmission element will intercept the center line of radially misaligned connected shafts.

In this application I show and describe only several embodiments of my invention simply by way of illustration of the practice of my invention as by law required. However, I recognize that my invention is capable of other and different embodiments, and that the various details thereof may be modified in various ways, all without departing from my said invention; therefore the drawing and description herein are to be considered as merely illustrative and not as exclusive.

Figure 2:
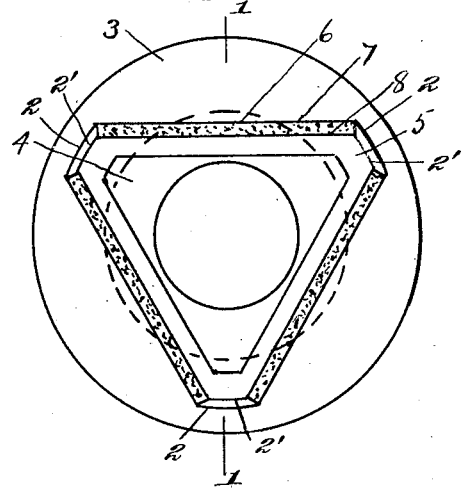
Figure 3:
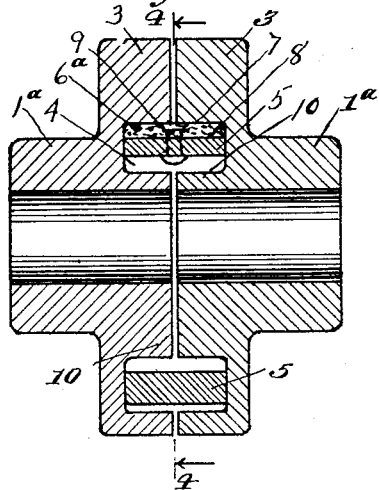
Figure 4:
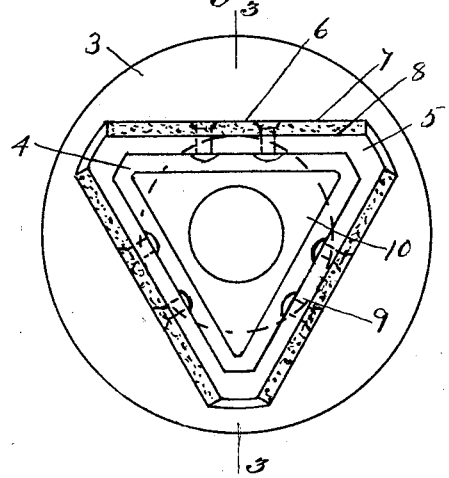

In the accompanying drawing:

Figure 1 represents a longitudinal central sectional view on the line 1—1 of Fig. 2 through a coupling embodying the preferred form of my invention;

Figure 2, a cross-sectional view on the line 2—2 of Fig. 1, looking in the direction of the arrows, the coupling block or spider 5 with its cushioning elements 6 being shown in end elevation;

Figure 3, a view similar to Fig. 1 of a modified form, taken on the line 3—3 of Fig. 4; and Figure 4, a view similar to Fig. 2 of said modified form, taken on the line 4—4 of Fig. 3.

Referring now in detail to the drawing, the hubs 1 are adapted to be mounted in any suitable manner to turn therewith upon the adjacent ends of the two shafts, not shown, to be flexibly coupled to turn about the same axis. Each said hub 1 has a preferably annular radially extending preferably integral flange 3 axially recessed as at 4, the inner faces 7 of the side walls of said recess defining a triangle, with the angles thereof flattened or rounded, as at 2, all as shown in Fig. 2.

A triangular coupling block, insert or element 5, which will preferably in the larger size couplings be in the form of a spider, frame or shell and of metal with its tips or points rounded or flattened as at 2', extends axially into the recesses of the two hubs 1, spanning the interval between them so as to drive one hub from the other. Cushioning means or liners 6, preferably of leather, will preferably be provided on the faces 8 of the coupling block or spider 5, and may comprise two strips arranged parallel to each other on each such operative face 8, and respectively adjacent the axial edges thereof, of the spider 5, as illustrated in Fig. 1, and such cushioning means or liners 6 may be secured to the said faces 8 of said block 5 in any suitable manner, as, for instance, by any suitable adhesive, shellac being employed for such purpose in the embodiment illustrated in Figures 1 and 2.

The block or spider 5 is to be of such size that, when said cushioning means 6 are applied to its faces 8, it will make a snug fit in the triangularly shaped recesses 4 of the opposed hubs 1 with said cushioning means in, or substantially in, engagement with the opposed faces 7 of the side walls of said recesses 4 respectively. The axially extending side walls of each hub recess and those of the corresponding projecting end portions of the floating male member, with the interposed cushioning means, provide at the same time within both recesses extended face to face driving contact as against mere line contact, but this language does not imply that the opposed faces in either recess are in contact throughout their entire area.

The embodiment above described may be used to advantage where considerable latitude is needed in the spacing of the coupled shafts. If it is desired to have the ends of the shafts meet they may be shoved into the hollow spider 5, on the other hand, if such meeting of the ends is not particularly desired they may have a considerable interval left between them. Where the shafts project into the hollow spider, clearance is left exterior to the bores for the shafts (as indicated in all the figures) to avoid interference with the self-accommodating movement of the spider.

The triangular coupling block or insert 5, as illustrated, is of spider or open frame form and preferably of metal and preferably slightly resilient as a whole, and is designed for the coupling of large or medium size shafts. However, in coupling small shafts a coupling block of a solid piece of wood, preferably having the cushioning means 6, may be employed, and for very small sizes of shafts a solid triangular piece of rubber or other suitable material permitting relative movement of the hubs 1 to suit misaligned conditions may be employed, dispensing with the distinct cushioning means 6.

The metal spider 5 illustrated will be of such material that, as a whole, it will be resilient to such extent as to allow it to partially absorb in itself, and flatten out, usual jerks, jars and stresses due to usual running conditions without damage, and in all cases whether the coupling block 5 be of metal, wood, rubber or other material, it will as a whole have a limited amount of resiliency or cushioning or shock absorbing ability for obvious reasons.

In the modification illustrated in Figures 3 and 4, the construction and operation are in all respects the same as in the preferred form, except that the hubs 1a have preferably triangularly shaped extensions 10 projecting axially into the recesses 4 of their respective flanges 3, with the ends of said extensions 10 substantially flush with the adjacent axial faces of their respective flanges 3, such extensions 10 respectively serving as supports for the inner ends of their respective shafts, not shown, and instead of the two cushioning strips or liners 6 applied to each radially outer operative face of the block 5, a single, preferably leather, liner 6a is secured to each face of the block 5 by any suitable means as, for instance, rivets 9.

It will be seen that in both forms the hubs are coupled together solely by means of the floating resilient coupling and cushioning insert, block, spider or element 5, triangular in shape to cooperate with the operative faces of the walls of the triangular recesses in the said hubs, regardless of the detail construction of, or material of, said coupling block 5.

Having thus described my invention, what I claim as new and desire to secure by Letters Patent is:

1. A coupling having hubs adapted to be mounted upon shafts to be coupled, said hubs having axially projecting opposed flanges formed with opposed registering axial recesses, each said recess being angular in cross-section, and each said hub being formed with an axial projection extending into its recess and centrally bored in continuation of the bore in said hub, said axial projection affording support to the extreme inner end portion of the shaft to which said hub is applied, in combination with a resilient open-frame coupling spider extending axially and floatingly between said hubs and corresponding in cross-sectional shape and in size to said recesses and simultaneously fitting snugly in both said recesses to transmit motion from one of said hubs to the other.

2. A shaft coupling having hubs adapted to be mounted upon shafts to be coupled, said hubs having axially projecting opposed flanges formed with opposed axial recesses, each said recess being angular in transverse cross-section, in combination with a resilient open-frame male coupling member extending axially within both said recesses, substantially corresponding in transverse cross-sectional size and shape thereto and, with the interposition of cushioning material between overlapping portions of each said recess and the coupling member, fitting, and floating at the same time in both said recesses with opposed walls of said coupling member and of each of said recesses having extended face to face driving contact, the space within the open frame being sufficient to provide room for the shaft ends and additional clearance exterior to the bores for the shafts sufficient in amount to permit free floating of the coupling member without internal obstruction.

3. A shaft coupling having opposed hubs each provided with an axially extending recess having one end open and facing the open end of the recess in the other hub and having flat side wall portions, in combination with a floating male coupling member having a resilient open angular metal frame, said metal frame extending axially into each recess and having flat side wall portions floating therein, with the interposition of cushioning material, in extended floating face to face driving contact with wall portions of both said recesses at the same time.

4. A shaft coupling having opposed hubs provided with corresponding transversely triangular axial recesses having open ends facing each other, and a transversely triangular resilient open frame floating coupling member extending into and, with the intervention of cushioning material between overlapping portions of said recesses and the coupling member, fitting each of said recesses and having plane side walls in extended floating face to face driving contact at the same time with the corresponding side walls of both said recesses to transmit motion from one said shaft and its hub to the other.

5. A shaft coupling having opposed hubs adapted to be mounted on shafts to be coupled and each provided with a transversely triangular axial recess facing the recess in the other hub and having flat side wall portions in combination with a floating male coupling member extending axially into both recesses and having side wall portions floating therein, with the interposition of cushioning material, in extended floating face to face driving contact with wall portions of both the recesses at the same time.

In testimony whereof, I have signed my name to this specification at New York, New York, this 17 day of July, 1928.

CHARLES HASKELL CLARK.